July 28, 1964　　　L. E. HENYON　　　3,142,195
TRANSMISSION
Filed Dec. 29, 1960　　　　　　　　　　　　6 Sheets-Sheet 1

INVENTOR.
LEWIS E. HENYON
BY Kenneth C. Witt
ATTORNEY

INVENTOR.
LEWIS E. HENYON
BY Kenneth C. Witt
ATTORNEY

*INVENTOR.*
LEWIS E. HENYON
BY
ATTORNEY

July 28, 1964     L. E. HENYON     3,142,195
TRANSMISSION

Filed Dec. 29, 1960     6 Sheets-Sheet 6

INVENTOR.
LEWIS E. HENYON
BY Kenneth C. Witt
ATTORNEY

United States Patent Office 3,142,195
Patented July 28, 1964

3,142,195
TRANSMISSION
Lewis E. Henyon, Jackson, Mich., assignor to Clark
Equipment Company, a corporation of Michigan
Filed Dec. 29, 1960, Ser. No. 79,436
5 Claims. (Cl. 74—359)

This invention relates to change speed power transmission mechanisms, and more particularly to such transmission mechanisms having constantly meshing gears plus clutches for selectively clutching such gears to rotatable shafts to provide the desired gear ratio between the input and output shafts of the transmission.

The present transmission is power shifted and is intended primarily for use in the propulsion of heavy duty automotive vehicles, but it will be apparent that it is not limited to such use and may be adapted for the transmission of power in other applications.

In constant mesh transmissions it is inherent that certain of the gears must be mounted for rotation relative to coaxial shafts, and clutches are provided for selectively connecting such gears to their coaxial shafts for conjoint rotation. Usually some portion of the clutch also rotates with the gear with respect to the shaft when the clutch is disengaged. Heretofore such gears and rotating clutch parts ordinarily have been journaled directly on the shaft whereby the forces acting on the gears and clutch parts act also on the shaft.

The object of the present invention is to provide a transmission having improved mounting means for such gears and clutch parts in order to relieve the shafts and bearings as much as possible of extraneous forces not associated with the actual transmission of drive torque.

In carrying out my invention in one preferred form thereof, I provide a change speed transmission having a casing wall which has an opening therethrough and a rotatable shaft journaled in the opening and extending beyond the wall. A clutch and gear support is secured to the casing wall, the support being provided with an annular portion surrounding the rotatable shaft in coaxial relation therewith, and a combined gear and clutch member is journaled on the said support, the clutch having a complementary member mounted on the shaft and arranged for coaction with the combined gear and clutch member to provide clutch engagement and secure the gear for rotation with the shaft.

For a clearer and more complete understanding of my invention, reference should be had to the following description and the accompanying drawing in which.

Figure 4:
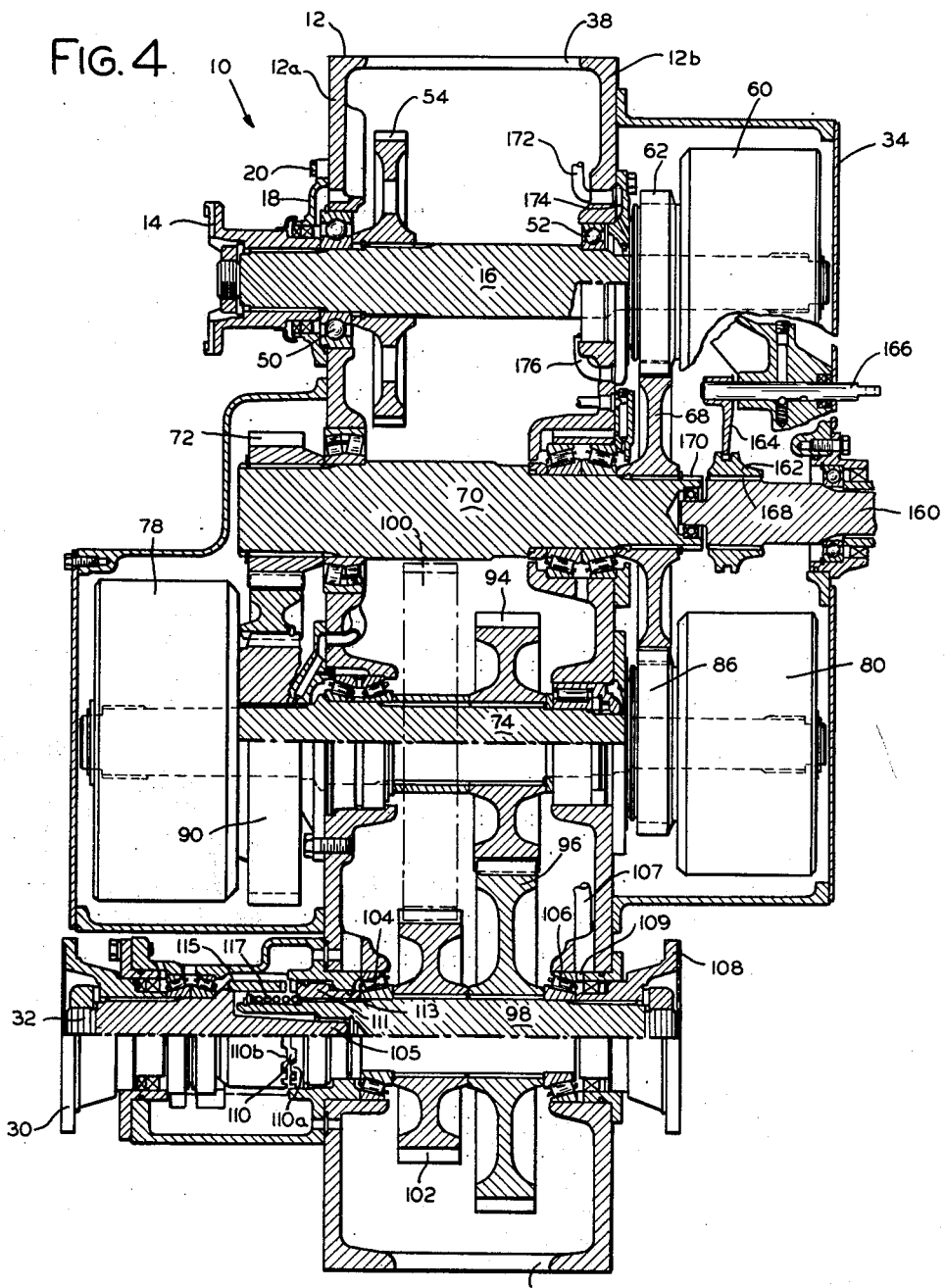
FIGURE 4 is a side elevational view in section along the line 4—4 of FIG. 3.

Referring to the drawing, I have indicated generally by the numeral 10 a transmission embodying the present invention. The numeral 12 identifies the main casing or structural portion of the transmission which houses or provides support for the shafts, gears, clutches and other parts; and as seen in FIG. 4 the principal front and rear walls of the casing are identified by the characters 12a and 12b respectively. The numeral 14 on the drawing indicates a portion of a coupling device which is mounted at the forward end of input shaft 16. A bearing cap 18 surrounds the input shaft outside the front wall 12a of the casing 12, the bearing cap being secured to the wall 12a in a suitable manner such as by a plurality of machine screws 20.

Figure 1:
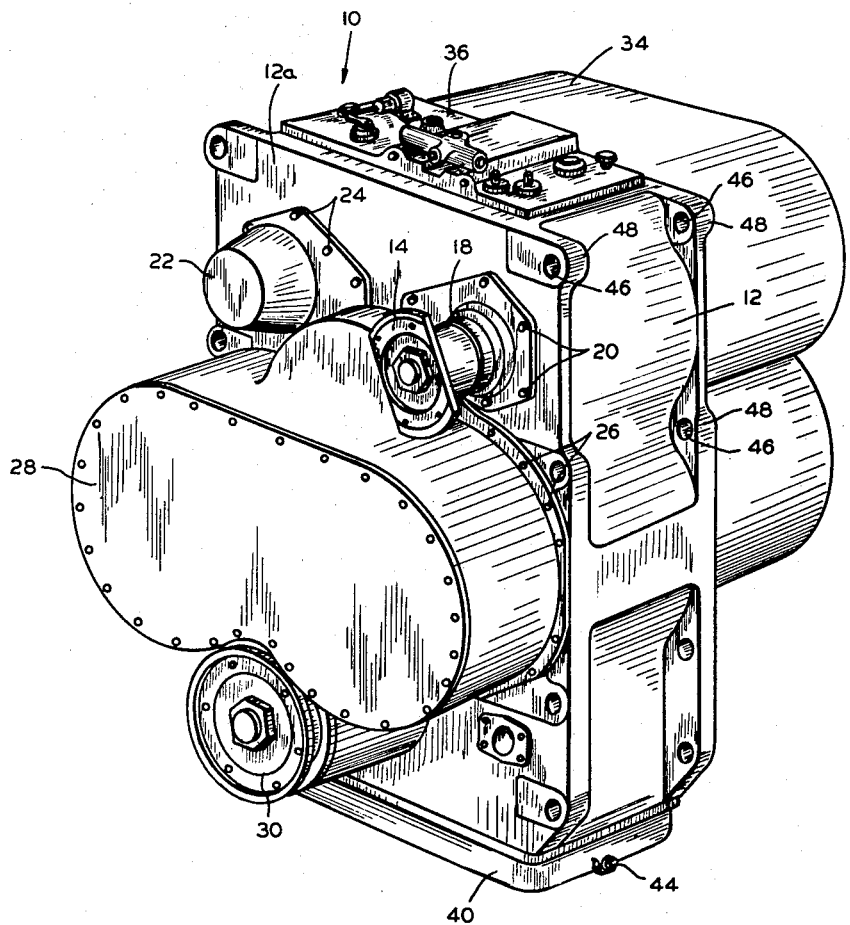
FIGURE 1 is a perspective view of the outside of a transmission embodying the present invention.

Also on the front wall of casing 12, as seen in FIG. 1, is a combined bearing cap and cover 22, secured to the casing 12 by means such as machine screws 24, which secures and covers the forward end of a reverse shaft which is described in more detail hereinafter. Also on the front wall 12a of the casing 12 and secured thereto by machine screws 26 or other suitable means is a clutch cover or housing 28 which houses two clutches and three gears which are described hereinafter.

Also appearing on the front of casing 12 is a portion 30 of a coupling device which may be utilized to couple an optional output shaft 32 (see FIG. 4) to a propeller shaft for operating the front wheels of a vehicle. It will be appreciated that member 30 is connected to a similar coupling device portion on the end of a propeller shaft leading to the vehicle front wheels or other instrumentality to be driven by optional output shaft 32. The clutch structure by which shaft 32 may be driven at the operator's option is described in more detail hereinafter.

Figure 3:
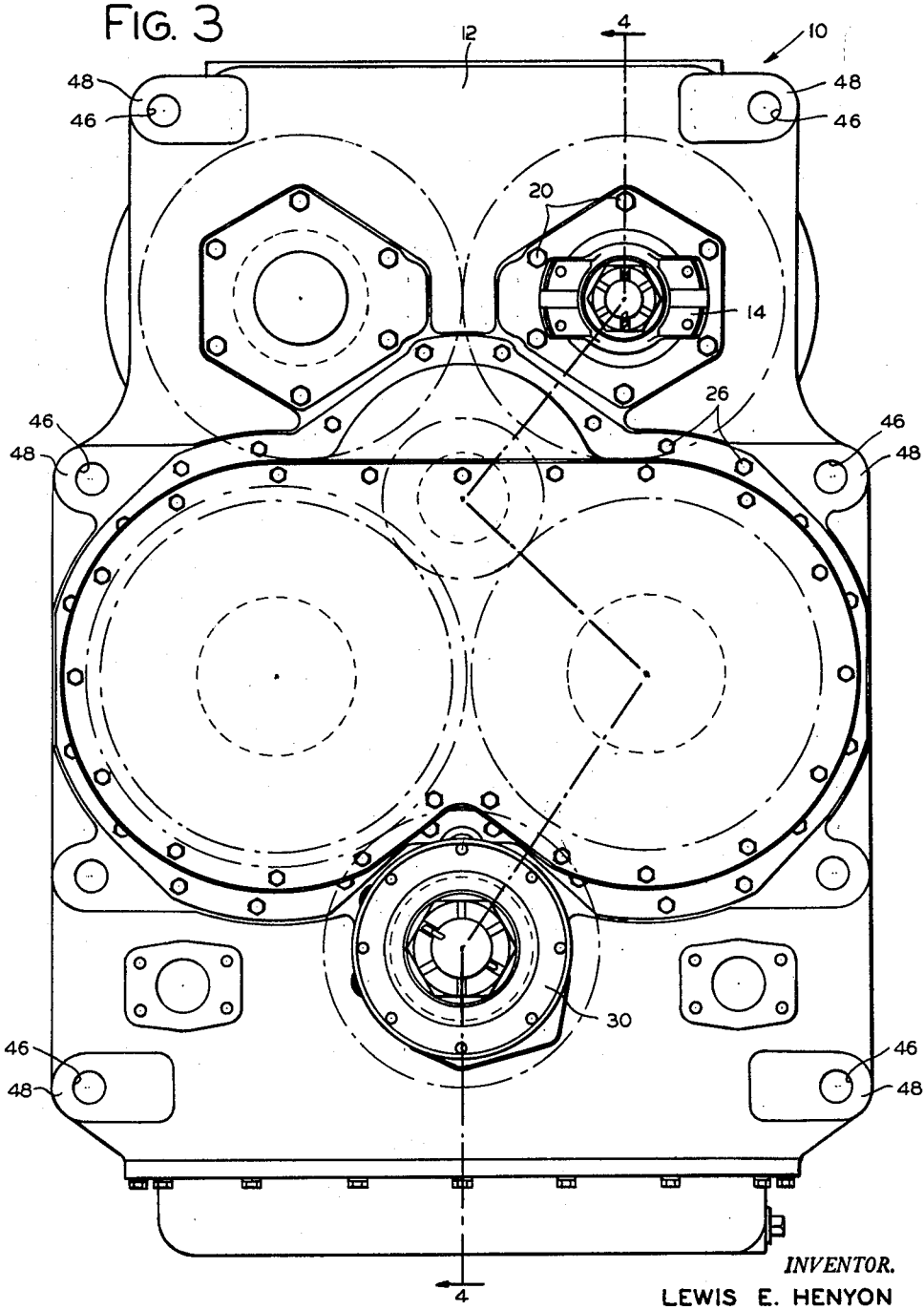
FIGURE 3 is a front end elevational view of the transmission of FIG. 1.

On the rear surface of wall 12b of casing 12 is secured a clutch cover or housing 34 which houses four clutches and associated gears which are described in detail hereinafter. As shown in FIG. 1, the casing 12 is provided with a cover member 36 for opening 38 (see FIG. 4) in the top, while at the bottom of casing 12 a pan or sump member 40 is provided which covers the bottom opening 42 (see FIG. 4) in the casing 12 and provides a reservoir for the liquid utilized in the transmission for lubrication and cooling and for actuating the clutches. Parts 36 and 40 have been omitted from FIG. 4 to conserve space. The reservoir may be drained by removing plug 44 (see FIGS. 1 and 3). The transmission may be installed by the use of bolts or other securing devices through openings 46 in the bosses 48 on the casing 12.

Figure 2:
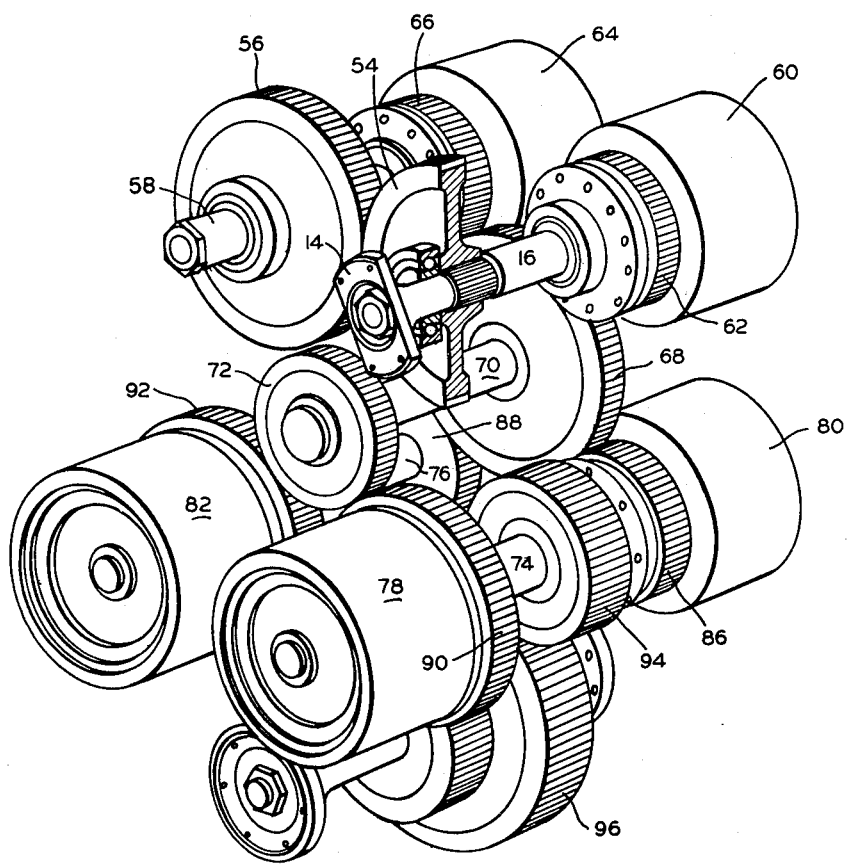
FIGURE 2 is a perspective view from approximately the same point as FIG. 1 but with the housing and casing members removed to show the shafts, gears and clutches.
Figure 5:
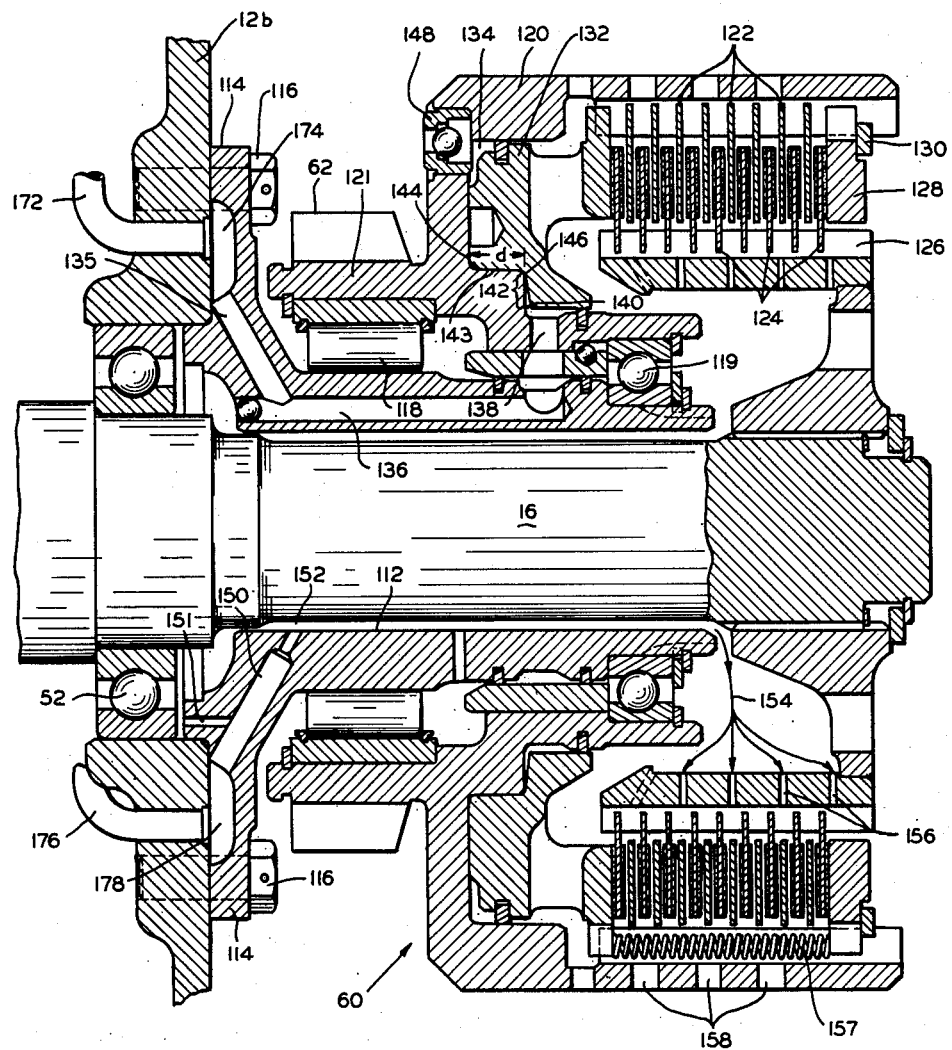
FIGURE 5 is an enlarged view in section of one of the clutches showing the mounting of the combined clutch and gear on the clutch and gear support which is secured to the casing wall.

Referring now to FIG. 4 and also to FIG. 2 which depicts more clearly the gear arrangement, it will be observed that the input shaft 16 is journaled by means of a ball bearing assembly 50 in the front wall 12a of casing 12 and by means of another ball bearing assembly 52 in the rear wall 12b of the casing 12. Shaft 16 carries a gear 54 splined or otherwise secured thereto which meshes with a gear 56 (see FIG. 2) which is secured to and rotates reverse shaft 58. A clutch 60 located outside the rear wall 12b of the casing may be selectively actuated to connect a gear 62 for rotation with the input shaft 16, while a clutch 64 may be selectively actuated to connect a gear 66 for rotation with the reverse shaft 58. The detailed construction of clutches 60 and 64 is shown in FIG. 5 which is described in detail hereinafter.

Both gears 62 and 66 are constantly in mesh with a gear 68 located rearwardly of wall 12b, which is secured to and rotates an idler shaft 70. The shaft 70 also has another gear 72 secured at the front end thereof in front of casing wall 12a, which rotates when gear 60 and shaft 70 rotate.

Figure 6:
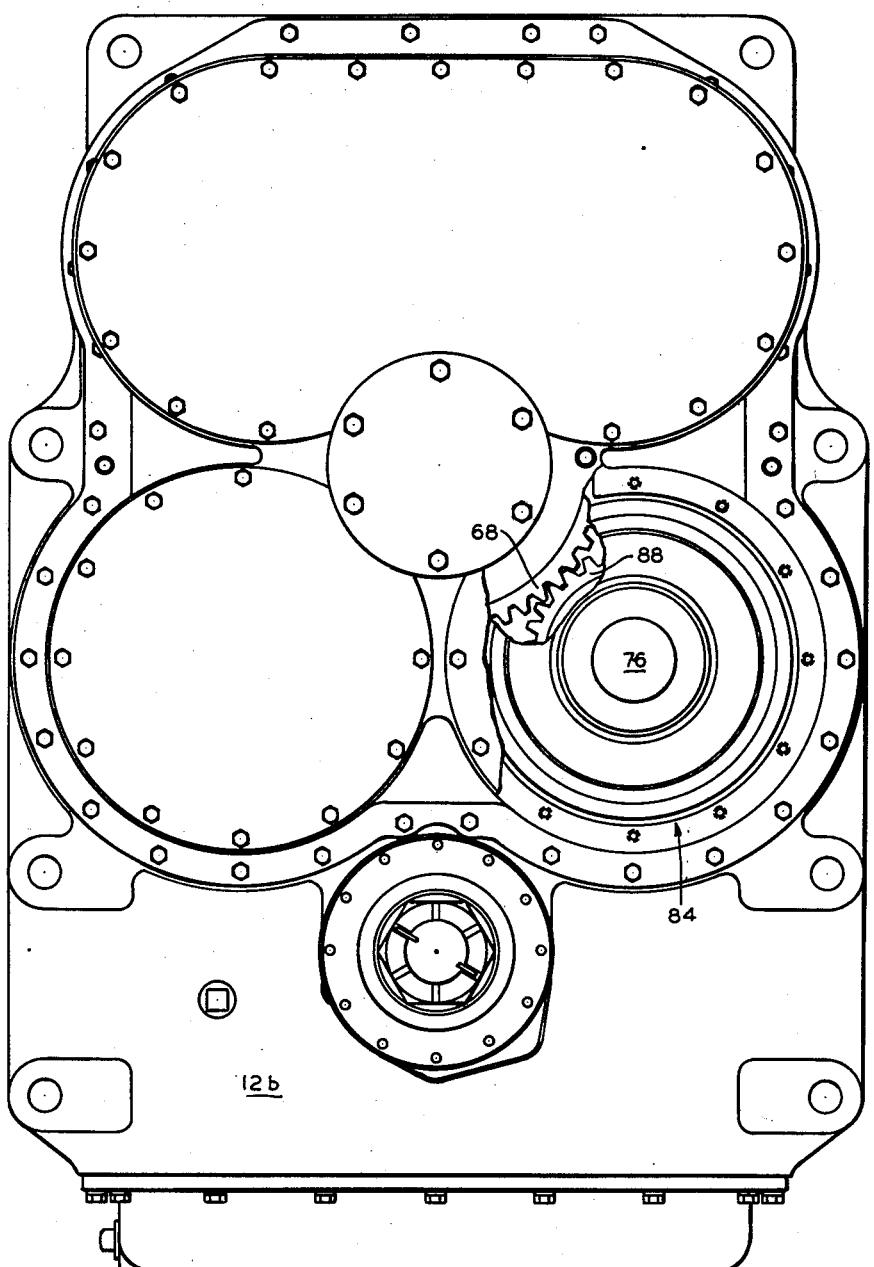
FIGURE 6 is a rear elevation of the transmission of FIGS. 1–5 with portions broken away to show certain parts which are not visible in the other figures.

Two so-called intermediate shafts are provided and these are indicated by the numerals 74 and 76. Each of these shafts has clutches at both ends, the clutch at the front end of shaft 74 being designated by the numeral 78 while the clutch at the rearward end of this shaft is designated 80. Shaft 76 has clutch 82 at the front end and at the other end is provided with a clutch indicated by numeral 84 which is visible in FIG. 6. The gear 68 on the idler shaft 70 is in constant mesh with gear 86 which may be selectively connected by clutch 80 to shaft 74, and also with a gear 88 which may be selectively connected by clutch 84 (see FIG. 6) to shaft 76. Similarly at the front of the transmission, gear 72 on the idler shaft is in constant mesh with a gear 90 which may be selectively connected by clutch 78 to shaft 74, while a gear 92, also in constant mesh with gear 72, may be selectively connected by clutch 82 to shaft 76.

Mounted on the shaft 74 for rotation therewith is a gear 94. Gear 94 is in constant mesh with a gear 96 which is secured to output shaft 98. Gear 100 is mounted on shaft 76 and is in constant mesh with gear 102 which likewise is mounted on output shaft 98. Gear 100 is shown in phantom in FIG. 4 to indicate that shaft 76 on which it is mounted is directly behind shaft 74 in this figure. Output shaft 98 is journaled in the front and rear walls 12a and 12b of the casing member 12 by means of anti-friction bearings which are illustrated as tapered roller bearing assemblies 104 and 106. A portion 108 of a coupling device is mounted on the rearward end of shaft 98, providing for coupling the output shaft to a propeller shaft for operating the rear wheels of a vehicle or other device to be operated by the transmission. As may be seen in FIG. 4, the portion 105 of the reduced diameter rearward end of shaft 32 is journaled in a mating recess in the forward end of shaft 98, and a tooth clutch mechanism 110 is provided for selectively connecting shaft 32 to shaft 98 when it is desired to provide drive forwardly as well as rearwardly from the transmission. Clutch 110 includes teeth 110a on a collar 111 which is splined at 113 or otherwise secured to shaft 98 in axially movable relation. Arranged to mate with teeth 110a are teeth 110b on a collar member 115 which is secured to shaft 32. The collar 111 is slidable axially to the left by a suitable mechanical or power operating mechanism, not shown, the collar 111 being returned to the right by a return spring 117 when it is desired to disconnect shaft 32. When this transmission is installed in a vehicle the shaft 32 is connected when it is desired to provide the vehicle with four-wheel drive, but when only two-wheel drive is desired, shaft 32 is disconnected and the sole drive is provided by shaft 98 through the coupling portion 108 at the rearward end thereof.

FIG. 5 illustrates in detail clutch 60. It is pointed out, however, that clutches 64, 80 and 84 are identical with this clutch, while clutches 78 and 82 are the same except as to size. Thus, an explanation of clutch 60 will suffice for all of the clutches.

In FIG. 5 I have indicated by the numeral 112 a fixed annular sleeve or quill member which is connected by means of a flange portion 114 thereon to the rear surface of rear wall 12b of the casing in a suitable manner such as by a plurality of machine screws 116. As shown, gear 62 is formed integrally on an axial projection 121 from a clutch drum which is indicated by the numeral 120. The combined gear and clutch drum structure is journaled on the tubular portion of member 112 by means of an anti-friction bearing shown as a roller bearing 118 and another anti-friction bearing shown as ball bearing 119. The drum 120 carries a plurality of annular friction discs 122 which are splined to the clutch drum for rotation therewith. Interleaved between the friction discs 122 are alternate annular discs 124 which are splined to a hub member 126 which in turn is splined to shaft 16 for rotation therewith.

The clutch structure includes a backing plate or ring 128 which is secured at the outer end of drum 120 in a suitable manner such as by a snap ring 130. The clutch is applied by compressing the stack of discs 122, 124 and this is accomplished by an annular piston member 132. The piston 132 is mounted for axial movement in a chamber 134 which is formed inside drum 120.

The piston is moved by fluid under pressure which is admitted through a slanted passageway 135 in member 112 to a longitudinal passageway 136 from which it passes through suitable sealing means to passageway 138 in the drum member and thence into chamber 134 and behind or to the left of piston 132 at location 140 which initiates movement of the piston to the right. Initial movement of the piston 132 is rapid upon the admission of fluid under pressure because only a small portion of the cross-sectional area of piston 132 is effective initially. This is the area which is indicated in the sectional view of FIG. 5 by the numeral 142 and bracket associated therewith. After piston 132 has moved distance "d" to the right and the shoulder portion on the piston indicated by the numeral 144 passes the shoulder 146 on the drum member, then the full end area of the piston 132 is exposed to pressurized fluid. This, of course, provides much greater pressure on the piston. The effect of the structure and operation just described is that the piston moves rapidly in the initial stages but with a relatively small force. When it nears the end of its stroke to the right to provide clutch engagement, increased force on the piston insures complete clutch engagement and lack of slippage during operation. It will be appreciated by those familiar with clutches of this type that a smooth transition may be provided between the fast and slow operating conditions of the clutch by controlling the leakage or flow of the pressurized liquid along the mating surfaces indicated by the numeral 143 between the two portions of the clutch chamber.

When it is desired to disengage the clutch the source of pressurized fluid is disconnected and fluid is released from chamber 134 by means of a step-type ball check valve 48. The piston 132 is then retracted by a plurality of springs 157 extending between the piston and backing ring 128, one of which is visible near the bottom of FIG. 5. As indicated by the drawing, the spline projections on the multiple discs 122 are omitted or cut off at intervals around the periphery of these discs, and retracting springs are inserted, as shown, in the corresponding spline grooves in the drum 120. For more information on the valve 48 reference may be had to Patent 2,954,040 wherein such a valve is disclosed in detail and claimed.

For cooling the clutch during the time when it is not engaged and there is relative motion between the alternate friction discs, a passageway 150 is provided through which cooling fluid is supplied under pressure to the annular space 152 between shaft 16 and sleeve member 112 from whence the fluid flows along the path indicated by the line 154 through openings 156 in the hub member 126, thence over the surfaces of the discs 124 and 122 and out through the openings 158 in the drum member 120; after which such fluid drains back to the sump by gravity.

A further feature of this transmission is the so-called power take-off which is illustrated in FIG. 4 of the drawing. This power take-off mechanism comprises a shaft 160 which is arranged to be selectively connected to shaft 70 in order to drive simultaneously an auxiliary device on a vehicle or other device which it is desired to drive in addition to the mechanism driven by the main output shaft 98. Shaft 160 is connected to shaft 70 merely by shifting collar 162 to the left means of a shifter fork 164 which is operated by a rod 166. It will be observed that collar 162 is splined to shaft 160 at 168. The shaft 70 is provided with suitable splines at 170 and when collar 162 is moved to the left a driving connection is thereby provided between shaft 70 and shaft 160.

While most of the piping has been omitted from the drawing in order to simplify it, it will be appreciated by those skilled in the art that a pump or other source of pressurized fluid is provided which supplies fluid for the operation and cooling of all of the clutches and also for the pressure lubrication of all bearings as described hereinafter. Such pressurized fluid is regulated as to pressure and controlled by suitable control valves (not shown) in a manner such that it is admitted selectively to the clutches which are to be actuated. In FIG. 4 there appears a fragmentary portion of a conduit or pipe 172 which supplies pressurized fluid to the chamber 174 shown in this figure and in FIG. 5 from whence fluid flows through passageway 135 and thence into the clutch actuating chamber in the manner previously described. Conduit or pipe 176, a fragment of which is shown in FIG. 4 also, supplies cooling fluid to clutch 60 through wall 12b of the casing into chamber 178 and thence through passageway 150 and space 152 in the manner previously described to cool the clutch discs. It will be appreciated that all six of the clutches are actuated and cooled in the same manner described for clutch 60.

Each of the anti-friction bearings associated with one of the clutches is continuously lubricated by fluid under pressure and this is illustrated in FIG. 5 of the drawing. A passageway 151 directs pressurized fluid from passageway 150 through bearing 52 continuously. Each of the other friction bearings in the transmission also is continuously pressure lubricated in a similar manner and this is illustrated by conduit 107 a fragment of which is illustrated in FIG. 4. Conduit 107 admits pressurized fluid continuously through an opening 109 and provides for the continuous flow of lubricant through anti-friction bearing 106.

The transmission described and illustrated herein provide for the rotation of output shaft 98 in either direction at any of four different gear ratios. This transmission is intended primarily for use in a vehicle, therefore, the two directions will be referred to in the following description of the operation of the transmission as forward and reverse. To operate the output shaft 98 in a forward direction, clutch 60 is engaged, this clutch being referred to in the following explanation as the forward clutch. The first forward ratio is provided by engaging clutch 78 in addition to clutch 60. The drive can then be traced from input shaft 16 through clutch 60 and gears 62 and 68 to idler shaft 70 thence through gears 72 and 90 and through clutch 78 to shaft 74 from which gears 94 and 96 drive output shaft 98. This provides the greatest gear reduction of the four ratios. If less gear reduction is desired, clutch 78 is disengaged and clutch 82 is engaged. In this ratio the drive is the same down to the idler shaft from which it may be traced through gears 72 and 92, through clutch 82 to shaft 76, thence through gears 100 and 102 to shaft 98.

If the next lower ratio gear reduction is desired, clutch 82 is disengaged and clutch 80 is engaged. The drive then may be traced from the idler shaft 70 through gears 68 and 86 and clutch 80, thence from shaft 74 through gears 94 and 96 to shaft 98. The highest speed or smallest gear reduction is provided by disengaging clutch 80 and engaging clutch 84 whereupon the drive is from the idler shaft through gears 68 and 88 and through clutch 84, thence through shaft 76 and gears 100 and 102 to shaft 98.

It will be understood from the foregoing explanation that in order to change ratios it is necessary only to disengage one clutch and engage another clutch. It is not necessary for any ratio change simultaneously to disengage two clutches and engage two other clutches.

To provide reverse drive clutch 60 is disengaged and clutch 64 is engaged whereupon the drive may be traced from the input shaft 16 through gears 54 and 56 to reverse shaft 58, and thence through clutch 64 and gears 66 and 68 to idler shaft 70 which then rotates in the opposite direction to that previously described when clutch 60 was engaged. It will be understood that each of the four ratios previously described for forward operation may be obtained for reverse operation and may be traced in the same manner from idler shaft 70. The only difference is that idler shaft 70 now is turning in the opposite direction so that the output shaft 98 likewise turns in the opposite direction. As illustrated gears 54 and 56 are identical as are gears 62 and 66; therefore the total gear reduction is exactly the same for both directions of operation.

While I have illustrated and described my invention herein embodied in a specific transmission in compliance with the patent statutes, it will be readily apparent to those skilled in the art that my invention is not limited to the specific transmission disclosed. It should be understood, therefore, that I intend to cover by the appended claims all modifications which fall within the true spirit and scope of my invention.

I claim:

1. In a change speed transmission having a casing wall provided with a pair of openings therethrough, a rotatable shaft journaled in one of the said openings in the casing wall and having a projecting unsupported end portion, a clutch support non-rotatably secured only to the casing wall and having an annular portion surrounding the said projecting end portion of the rotatable shaft in coaxial relation therewith, a clutch having a friction member mounted on the said shaft for rotation therewith and a complementary member journaled solely on the said clutch support for rotation and adapted for selective clutching engagement with the said friction member, the said complementary member including an integral gear portion, a second shaft rotatably journaled in the other said opening, and a gear carried by the said second shaft and meshing with the said gear portion.

2. In a transmission, a casing wall provided with an opening therethrough, a rotatable shaft journaled in the said opening in the said casing wall, the said shaft extending outwardly from the said opening and terminating in an unsupported end, a support member non-rotatably secured to the said casing wall and having an annular portion surrounding the said rotatable shaft in coaxial relation therewith, a combination gear and clutch drum member journaled only on the said support member for rotation relative to the said shaft, and clutch means for selectively connecting the said drum member to the said shaft.

3. In a transmission, forward and rear vertically disposed walls having a plurality of pairs of aligned openings in the said walls, a plurality of rotatable shafts extending through the said pairs of openings in parallel relation to each other, the said shafts being journaled directly on the said walls by means of anti-friction bearings, certain of said shafts having portions thereof extending beyond the said walls, a plurality of clutch supports non-rotatably secured to the outer surfaces of the said walls and having annular portions surrounding the said extending portions of the rotatable shafts in coaxial relation therewith, a plurality of gears rotatably mounted respectively on the said supports, a plurality of multiple disc clutches arranged to selectively connect the said rotatable gears respectively to their coaxial shafts, each clutch including a drum member connected to the said gear and carrying a plurality of discs and additional discs interleaved with the said first discs and connected to the said shaft for rotation therewith and means for compressing the disc assembly of each clutch for providing clutch engagement and additional gears carried by certain of the said rotatable shafts in mesh with certain of the aforesaid gears and arranged to form in cooperation therewith a complete gear train upon the engagement of selected ones of the said multiple disc clutches.

4. In a change speed transmission, forward and rear vertically disposed walls arranged parallel to each other and having a plurality of pairs of aligned openings in the said walls, a plurality of rotatable shafts extending through the said pairs of openings in parallel relation to each other, the said shafts being journalled directly on the said walls by means of anti-friction bearings, certain of the ends of said shafts extending beyond the said walls in unsupported relation, a plurality of support members non-rotatably secured to the outer surfaces of the said walls and having annular portions surrounding the said ends of the rotatable shafts in coaxial relation therewith, a plurality of clutch drum members having external gear portions thereon each journalled solely on one of the said annular portions for rotation relative thereto, each said clutch drum member carrying a plurality of clutch discs, additional sets of clutch discs carried respectively by the said projecting shaft ends and interleaved with the clutch discs on the associated clutch drum members, means for compressing the clutch disc assemblies thus formed to selectively apply the respective clutches, and additional gears carried by certain of said shafts in mesh respectively with the aforementioned gears and arranged to provide a complete gear train upon the application of predetermined clutches.

5. In a transmission having a casing wall with a pair of openings therein, a rotatable shaft journaled in one of the said openings, said shaft having a portion thereof extending outwardly from said one opening and terminating in an unsupported end, a stationary support member secured to the said casing wall and having an annular portion surrounding the said shaft extension portion in coaxial relation therewith, a clutch comprising a first clutch portion carried by said shaft for rotation therewith and a second clutch portion selectively engageable with said first clutch portion for conjoint rotation therewith, said second clutch portion being supported solely by said annular portion for rotation thereon, a gear carried by the said second clutch portion for rotation therewith, a second shaft rotatably journaled in the other of the said openings in the casing wall, and a gear carried by said second shaft in mesh with said first-mentioned gear.

References Cited in the file of this patent

UNITED STATES PATENTS

| | | |
|---|---|---|
| 2,553,376 | LeTourneau | May 15, 1951 |
| 2,583,556 | Fleischel | Jan. 29, 1952 |
| 2,712,245 | Lee | July 5, 1955 |
| 2,811,048 | Dence et al. | Oct. 29, 1957 |
| 2,823,777 | Banker | Feb. 18, 1958 |
| 2,867,126 | Bolster | Jan. 6, 1959 |